United States Patent
Acker et al.

(10) Patent No.: US 9,760,841 B2
(45) Date of Patent: Sep. 12, 2017

(54) ABAP UNIFIED CONNECTIVITY

(71) Applicant: SAP SE, Walldorf (DE)

(72) Inventors: Michael Acker, Grossfischlingen (DE); Alexander Wachter, Bad Schoenborn (DE); Daniel Walz, Rastatt (DE); Marc Noe, Schefflenz (DE); Hong-Nghiep Phan, Mannheim (DE); Omar-Alexander Al-Hujaj, Bad Schonborn (DE); Sasan Memar-Zahedani, Bammental (DE); Michael Kraemer, Carlsberg (DE); Thomas Weiss, Heidelberg (DE); Masoud Aghadavoodi Jolfaei, Wiesloch (DE)

(73) Assignee: SAP SE, Walldorf (DE)

( * ) Notice: Subject to any disclaimer, the term of this patent is extended or adjusted under 35 U.S.C. 154(b) by 185 days.

(21) Appl. No.: 13/722,434

(22) Filed: Dec. 20, 2012

(65) Prior Publication Data
US 2014/0180737 A1    Jun. 26, 2014

(51) Int. Cl.
*G06Q 10/00*    (2012.01)
*G06F 9/50*    (2006.01)
*G06F 9/54*    (2006.01)

(52) U.S. Cl.
CPC ........... *G06Q 10/00* (2013.01); *G06F 9/5055* (2013.01); *G06F 9/54* (2013.01)

(58) Field of Classification Search
CPC ............................. G06Q 10/00; G06Q 30/02
USPC ............................................... 705/7.11–7.42
See application file for complete search history.

(56) References Cited

U.S. PATENT DOCUMENTS

| | | | |
|---|---|---|---|
| 8,126,722 B2 * | 2/2012 | Robb et al. | 705/1.1 |
| 8,478,766 B1 * | 7/2013 | Tsypliaev et al. | 707/756 |
| 2004/0210452 A1 * | 10/2004 | Aboujaoude et al. | 705/1 |
| 2008/0014929 A1 | 1/2008 | Padmanabhuni et al. | |
| 2008/0114847 A1 * | 5/2008 | Ma et al. | 709/206 |
| 2009/0089109 A1 * | 4/2009 | Rabetge | G06F 9/44505 705/7.29 |
| 2009/0171720 A1 * | 7/2009 | Crook et al. | 705/7 |
| 2010/0030604 A1 | 2/2010 | Cummins | |

(Continued)

OTHER PUBLICATIONS

European Search Report for EP 2 746 944 A3, Application No. EP 13 00 5522, search completed Jan. 29, 2016, 3 pages.

*Primary Examiner* — David Rines
(74) *Attorney, Agent, or Firm* — Mintz Levin Cohn Ferris Glovsky and Popeo, P.C.

(57) ABSTRACT

A method, a system, and a computer-program product for providing a unified connectivity to a plurality of business processes are disclosed. A plurality of business processes for connection to a server are provided. A uniform configuration connection assembly for connecting the plurality of business processes to the server is generated. The uniform configuration connection assembly is configured based on at least one profile corresponding to at least one business process in the plurality of business processes and contains at least one connectivity artifact for performing at least one connectivity task for at least one business process in the plurality of business processes. At least a portion of the plurality of business processes to the server is connected based on the generated uniform configuration connection assembly.

19 Claims, 7 Drawing Sheets

(56) References Cited

U.S. PATENT DOCUMENTS

2011/0004627 A1* 1/2011 Reca et al. .................... 707/778
2012/0179779 A1   7/2012 Awasthi

* cited by examiner

ABAP UNIFIED CONNECTIVITY

TECHNICAL FIELD

This disclosure relates generally to data processing and, in particular, to providing a unified connectivity to a plurality of business processes.

BACKGROUND

Businesses implement and rely on a plurality of business process applications and software in their day-to-day activities. Such business process software can run on various networks that have a multitude of users connected to it. The users can create, design, run, update and/or otherwise use the networks and/or business process applications residing on such networks. The networks can be supported by various servers and/or other components, which can provide connectivity to network components, users of the components and/or applications residing and/or otherwise connecting to the network and/or its components.

Applications and/or services can be programs that an end-user runs to accomplish certain tasks. Applications and/or services can work in conjunction with one or more back-end systems, which can store the data to be worked on, such as for example business objects and other business data, as well as logic for manipulating the data, such as for example transactions or other business logic. Examples of back-end systems may include database systems, enterprise resource planning ("ERP") systems, and customer relationship management ("CRM") systems. A user interface ("UI") can be designed to work in concert with application programs, and facilitates interaction between humans and computers by inviting and responding to user input. In order to accomplish various tasks, a user can initiate various applications, tasks, agents, etc. that may manipulate data in different ways to achieve results desired by the user.

However, in order to allow users to use such application and/or services, appropriate connections and configurations of such connections may be required. Further, each application and/or service may require its own connection as well as a separate configuration of such connection, which can be costly, time-consuming and inefficient.

SUMMARY

In some implementations, the current subject matter relates to a computer implemented method for providing unified connectivity to business processes. The method can include providing a plurality of business processes for connection to a server, generating a uniform configuration connection assembly of the plurality of business processes to the server, and connecting at least a portion of the plurality of business processes to the server based on the generated uniform configuration connection assembly. The uniform configuration connection assembly can be configured based on at least one profile corresponding to at least one business process in the plurality of business processes and can contain at least one connectivity artifact for performing at least one connectivity task for at least one business process in the plurality of business processes. At least one of the providing, the generating, and the connecting can be performed on at least one processor.

In some implementations, the current subject matter can include one or more of the following optional features. The plurality of business processes can include at least one of the following: a service, a destination, and a service proxy. The service proxy can be a local representation of a remote process. At least one business process in the plurality of business processes can be an external business process. The generated uniform configuration connection assembly can be generated based on a grouping of a plurality of profiles of at least a portion of business processes in the plurality of business profiles. At least one connectivity artifact may include at least one of the following: a connectivity client for initiating at least one communication request, processing data, sending data or receiving data associated with at least one business process in the plurality of business processes, a connectivity server for accepting the at least one communication request, processing data, sending data, or receiving data associated with the at least one business process, a client configuration data, a server configuration data, and data grouped together for reuse in any of the above-mentioned artifacts. The server can be an advanced business application programming server.

In some implementations, at least one profile can include at least one combination of attributes corresponding to at least one configuration of the uniform configuration assembly. The attributes can include at least one of the following: an attribute indicating encryption, an attribute indicating compression, an attribute indicating whether a callback is allowed, an attribute indicating whether a pop-up is allowed, a sequence of logon algorithms, a uniform resource locator for the at least one business process, an attribute indicative of an action in an error case, a virtual host information for the at least one business process, and a combination of any of the above attributes.

In some implementations, the uniform configuration connection assembly can be configured without configuring each business process in the plurality of business processes. At least one profile for at least one business process in the plurality of business processes can be combined within at least another profile for at least another business process in the plurality of business processes based on at least one of the following: an inheritance information for at least one of the at least one profile and at least another profile, and a listing of independent profiles.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
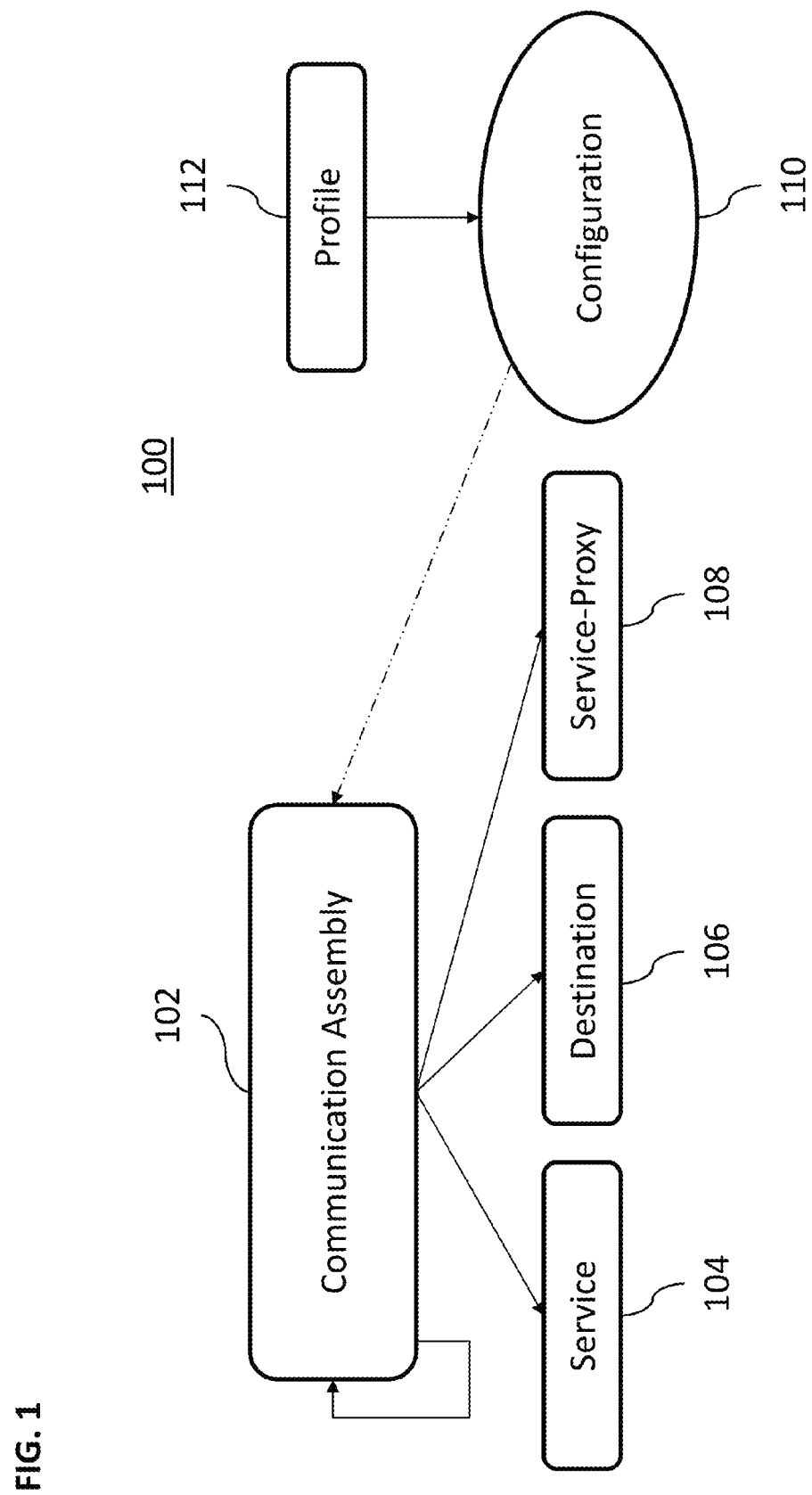
FIG. 1 illustrates an exemplary system for providing unified connectivity of an advanced business application programming server, according to some implementations of the current subject matter.

FIG. 1 illustrates an exemplary system 100 for providing unified connectivity of a business application server, according to some implementations of the current subject matter. For example, the business application server may be an advanced business application programming ("ABAP" as available from SAP AG, Walldorf, Germany) server. System 100 can include a communication assembly 102, a service 104, a destination 106, a service-proxy 108, a configuration 110 and a profile 112. In some implementations, a virtual host (not shown in FIG. 1) can communicate with the communication assembly 102. A virtual host can be used for hosting multiple domain names on a single server and/or pool of servers. Each domain name can be handled separately. Virtual hosting can allow one server to share its resources, such as memory and processor cycles, without requiring all services provided to use the same host name. A physical server can be divided into a plurality of logical servers. For example, in HyperText Transfer Protocol ("HTTP"), a logical name can be passed, e.g., www.mycompany1.com or www.mycompany2.com, where both can be handled by the same physical system (or server) which can have a technical name, e.g., "myhost" and a technical network address. Virtual hosts can be distinguished using several physical addresses on one host by using more than one network card and/or by assigning several addresses to one network card. This can be implemented in a Remote Function Call ("RFC") protocol that can be used by the current subject matter's system. Different addresses (logical and/or physical) can be used to secure a system landscape by allowing and/or banning addresses in firewalls, routers, etc. A virtual host can store physical addresses and/or at least one of the following attributes: an attribute indicative that only encrypted transfer is allowed, an attribute indicative of a white and/or blacklist of allowed client systems, an attribute indicative of at least one supported protocol, an attribute indicative of a default service that can be called when a passed service is not available, as well as any other attributes, and/or a combination of attributes. Further, some of the other objects can be subclassed.

The service 104 can be a HTTP service, a RFC service, a Simple Mail Transfer Protocol ("SMTP") service and/or any other service and/or any combination of services that can use at least one and/or any combination of protocols. The destination 106 and service-proxy 108 can also implement any of the services and/or protocols. The destination 106 can be a name and/or a placeholder for any physical system, server, service, application, etc. The service proxy 108 can be a local representation of a remote service.

Figure 2:
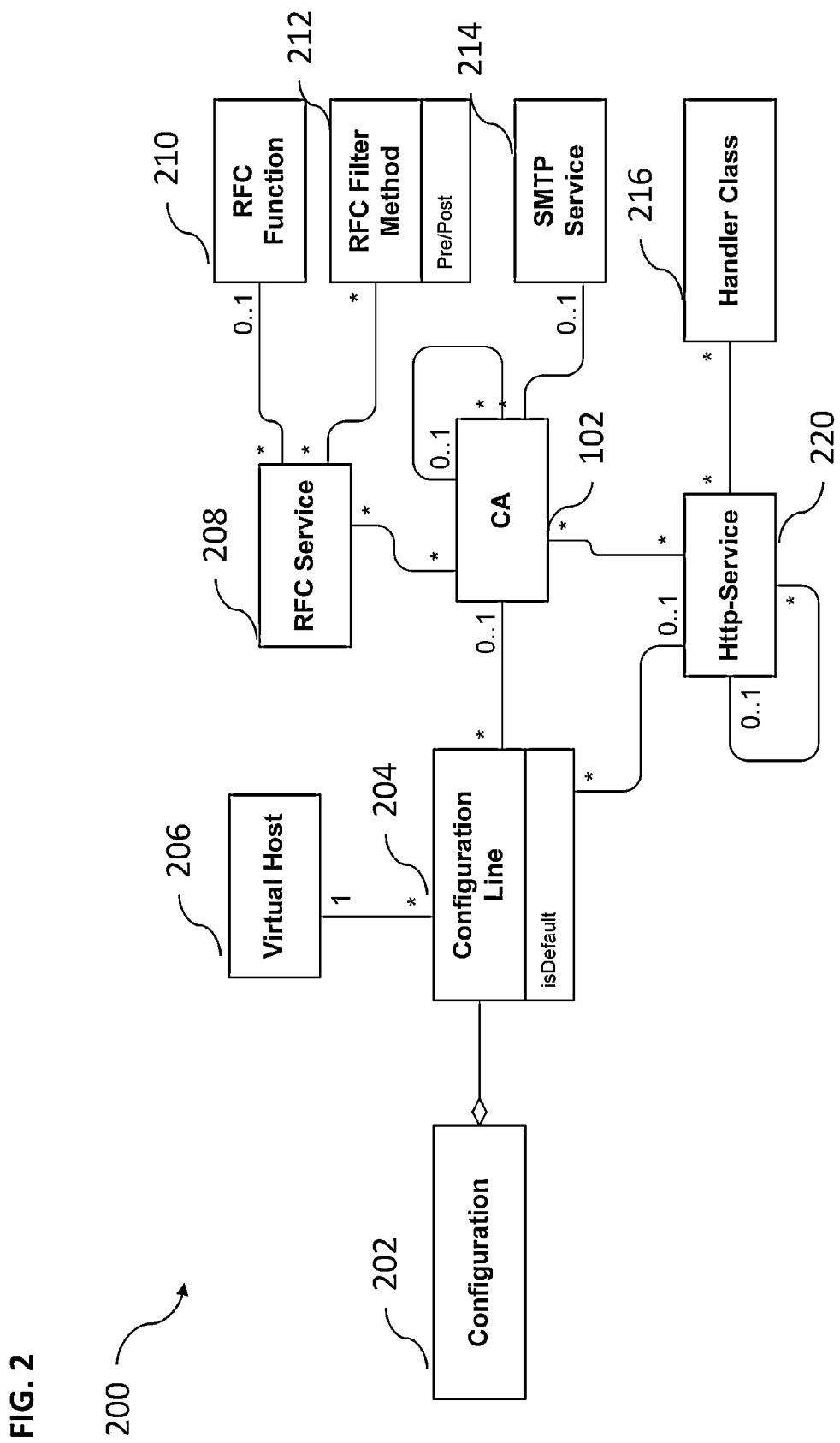
FIG. 2 illustrates an exemplary communication assembly, according to some implementations of the current subject matter.

The communication assembly 102 can provide connectivity for the service 104, destination 106 and/or service-proxy 108. FIG. 2 illustrates an exemplary communication assembly 102. The communication assembly can store connectivity information for each of the entities 104, 106, 108, and/or any other entities and/or objects (not shown in FIG. 2). The communication assembly 102 can include a configuration line 204 that can contain communication assembly configuration information 202. The configuration line 204 can also include information about at least one virtual host 206. The communication assembly 102 can also store information about services, e.g., at least one HTTP service 220, at least one RFC service 208, and at least one SMTP service 214. At least one HTTP service 220 can also include information about at least one handler class 216 (which can be receive a HTTP service and can return a HTTP response, for example). At least one RFC service can include information about at least one RFC function 210 and at least one RFC filter method 212.

The connection between various entities and/or objects can be provided using a server of a business organization and various business processes and/or applications of the organization as well as business processes and/or applications outside the organization. The communication assembly 102 can point to all connectivity artifacts which can fulfill all connectivity tasks for specific application(s). A connectivity artifact can be a set of data grouped together for representing connectivity entities. It can be created and maintained by a user and/or a generation program. A connectivity artifact can be read and executed by a connectivity runtime (e.g., client-runtime, server-runtime). Connectivity artifacts can include at least one of the following: a connectivity client which can initiate at least one communication request, process data and send/receive data, a connectivity server which can accept at least one communication request, process data and receive/send data, client configuration data, server configuration data, and/or data which can be grouped together for reuse in any of the above-mentioned artifacts.

The business organization can include, configure, and/or use more than one such communication assembly 102 to provide connectivity between its various business processes and/or applications and/or outside business processes and/or applications to reduce total cost of ownership of its systems as well as total cost of delivery of its products and services to its customers. Additionally, the communication assembly 102 can provide requisite security for its various connections and can be substantially error-free. The connectivity, components, business processes, applications, services, etc. can be internal to the business organization and/or external and/or a combination of both. The communication assembly 102 can provide a unified system for connecting various components, business processes, applications, services, etc. without separately configuring connections to and/or from each of the various components, business processes, applications, services, etc. In some implementations, a customer can be asked to configure a whole connectivity scenario (i.e., communication assembly 102), but might not be requested to configure each service. In addition to a configuration of the communication assembly 102 by an administrator, at least one service can have some features and/or settings that can be configured in order to work correctly. A service can recognize its creator and request a creator tool, e.g., a web service framework (such as Web Dynpro Framework available from SAP AG, Walldorf, Germany) for settings that can overwrite a setting specified by the user or force the user to change the settings during configuration. The creator tool can implement a unified connectivity plugin. Whether an attribute can be overwritten can be determined based on the attribute's importance (for example, an error-page that is not security relevant, but Web Dynpro (available from SAP AG, Walldorf, Germany) might need special error pages to work correctly, which can be overwritten by the Web Dynpro Plugin without asking the administrator, whereby a low security logon algorithm can be confirmed by the administrator when the administrator specifies a high security logon procedure).

In some implementations, the service 104 can offer various functionalities to customers of the business organization. The service 104 along with the destination 106 and service-proxy 108 can be developed and/or created by an application developer that may be charged with creation and/or development of particular services and/or products that can be used by the business organization whether internally and/or in connection with providing services to its customers. As part of the service 104, a business organization's server can receive various data as input, perform some operations on the data and produce output. The output can be sent to a client. The communication assembly 102 can provide such a connection along with various transfer communication protocols for transferring output of the server to the client.

As stated above, the service proxy 108 can be a local representation of a remote service, where the remote service can be a service that can be offered by the business organization through its client(s), partner(s), and/or any other vendor(s) of the business organization and that is not locally developed by the business organization. In some implementations, the remote service can be a service that can be developed by the business organization but that is not locally residing and/or operating on the server that is being accessed by a client of the business organization. The service-proxy 108 can help an application developer to call a remote service correctly. A service proxy can be defined on a client's side in a client-server system. The client can call a service proxy. During the call, a destination 106 can be specified by the client program and/or can be automatically selected by the service proxy 108. The service proxy 108 can further hide the service call from the user, thereby, making it easier for developers to call services.

As indicated above, the destination 106 can be a name and/or a placeholder for any physical system, server, service, application, etc. During development, an application developer might not foresee an exact address of the service that will be offered sometime in the future, but may know that the service, application, etc. that is being developed and/or obtained from a remote system will be offered. As such, the developer can include a reference to such future service, application, etc. in the business process as a placeholder, whereby once the service, application, etc. is offered by the business organization, the placeholder can be converted to an actual call for such service, application, etc. The application developer can also avoid specifying a particular type of service, application, etc., its address, protocols that the service, application, etc. can use, as well as any other information. Once the service, application, etc. becomes available, the developer can insert any information that may be pertinent to the proper operation of the service, application, etc.

The configuration 110 can be completed by a system administrator of the business organization. The administrator can specify concrete values for a complete communication connection grouped by the communication assembly 102. Further, the configuration 110 can be created by combining information contained in at least one profile 112. The profile 112 can contain predetermined configurations that can be either delivered together with the service, application, etc. and/or are created by the customer for reuse. The profiles can include at least one of the following attributes having specific values (included in a parenthetical): encrypted (yes/no), compressed (yes/no), callback allowed (yes/no), pop-ups allowed (yes/no), sequence of logon algorithms (user/password, different logon certificate solutions from various companies (e.g., SAP, Microsoft, Linux, etc.)), uniform resource locator ("URL") for the service (e.g., a URL /sap/bc/abc/service1 can be changed to /mycompany/abc/service1), an action in an error case (e.g., error pages, redirects, etc.), a virtual host for the service that can be available, and/or any other attributes and/or any combination(s) of any of the above attributes.

A profile can be an object that can store a set of attribute settings for reuse. The attributes of a profile might not be used directly in a runtime of a framework but can be used indirectly as the profile can be referenced in another object. Whenever an object does not specify a value for a specific attribute, the value for that attribute from the profile can be used. For example, a development group can deliver a set of services combined by a communication assembly and some destinations to access the services can be also combined in another communication assembly. Additionally, a profile for server configuration and a profile for client configuration can be delivered. The profiles can contain minimal security settings, such as, encryption active, support logon procedures, etc. Error pages can be defined in the server side profile. A profile might not include server specific attributes, such as, user/password or system names.

In some implementations, a communication assembly 102 can be configured without configuring each service 104, destination 106, and/or service-proxy 108. Configuration can be done on a higher level by combining already existing profile objects. In some implementations, the profiles can be combined based on at least one of the following: inheritance information for a profile and a listing of independent profiles. A profile can include at least some information that it can inherit from another profile. For example, any profile attribute that is not specified can be inherited from a parent profile. Further, if more than one profile is specified, information about each attribute in each profile can be obtained. If an attribute is specified in more than one profile, the highest and/or lowest value can be selected (e.g., more secure versus less secure). Upon configuration of the communication assembly, the service, destination, and/or service-proxy can be made available.

Figure 3:
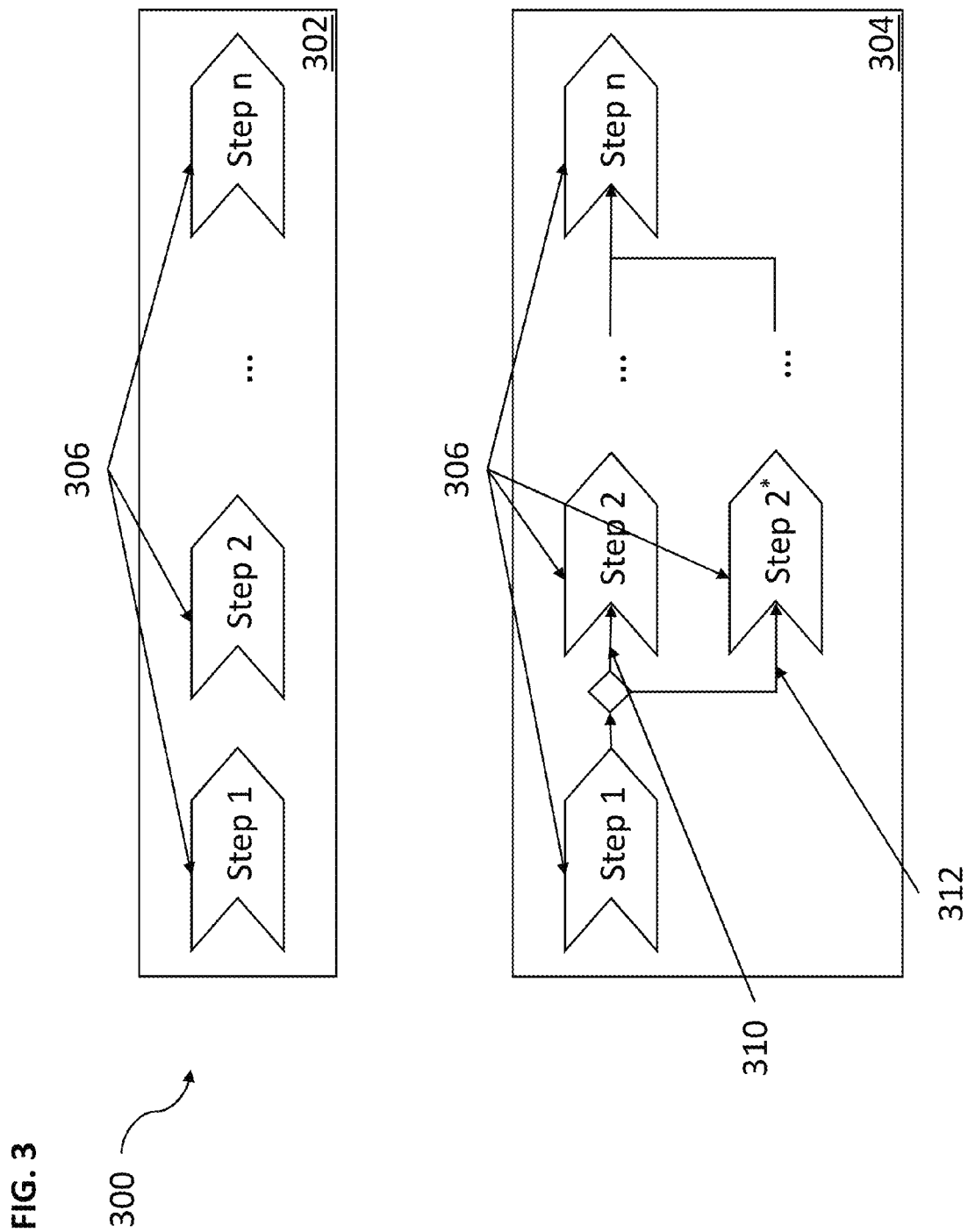
FIG. 3 illustrates an exemplary business process, according to some implementations of the current subject matter.
Figure 4:
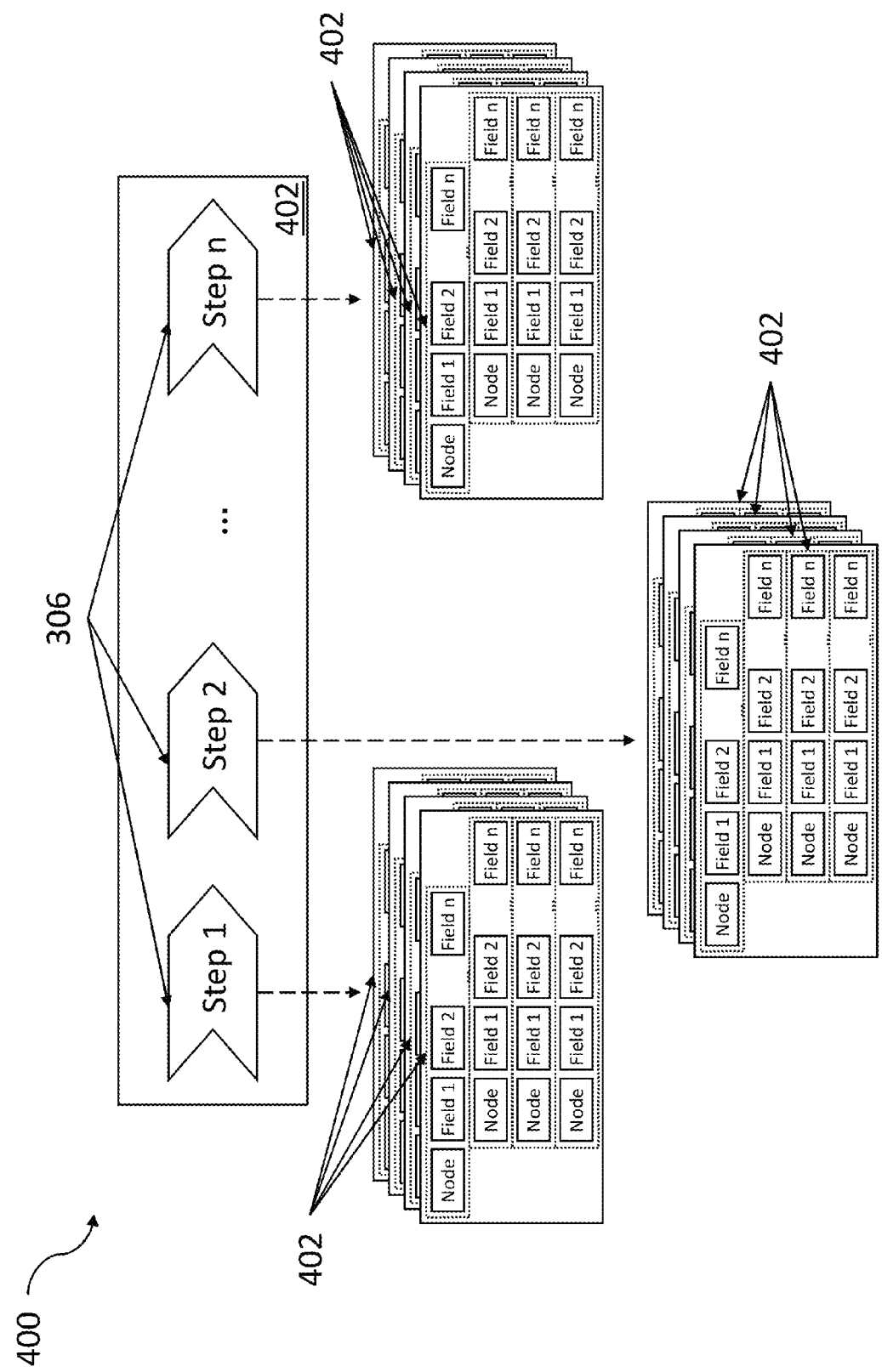
FIG. 4 illustrates another exemplary business process, according to some implementations of the current subject matter.

A business organization can have a defined set of business processes, applications, services, etc. that can be executed to perform various functions of the organization. As shown in the diagrams 300 and 400 of FIG. 3 and FIG. 4, respectively, business processes of an organization can include relatively simple business process 302 and more complex business processes 304. Each business process generally can include a sequence of actions 306. Each action or operation 306 can involve one or more data objects, such as business objects 402. A business object can be a data structure that can include at least one of a data element and a method, and the data can be organized to provide a specific business task, such as a purchase order, a sales order, line items, invoices, customer contact information, customer payment account information, and the like. A complex business process 304 can include conditions leading to one or more concurrently running sub-processes 310 and 312.

Figure 5:
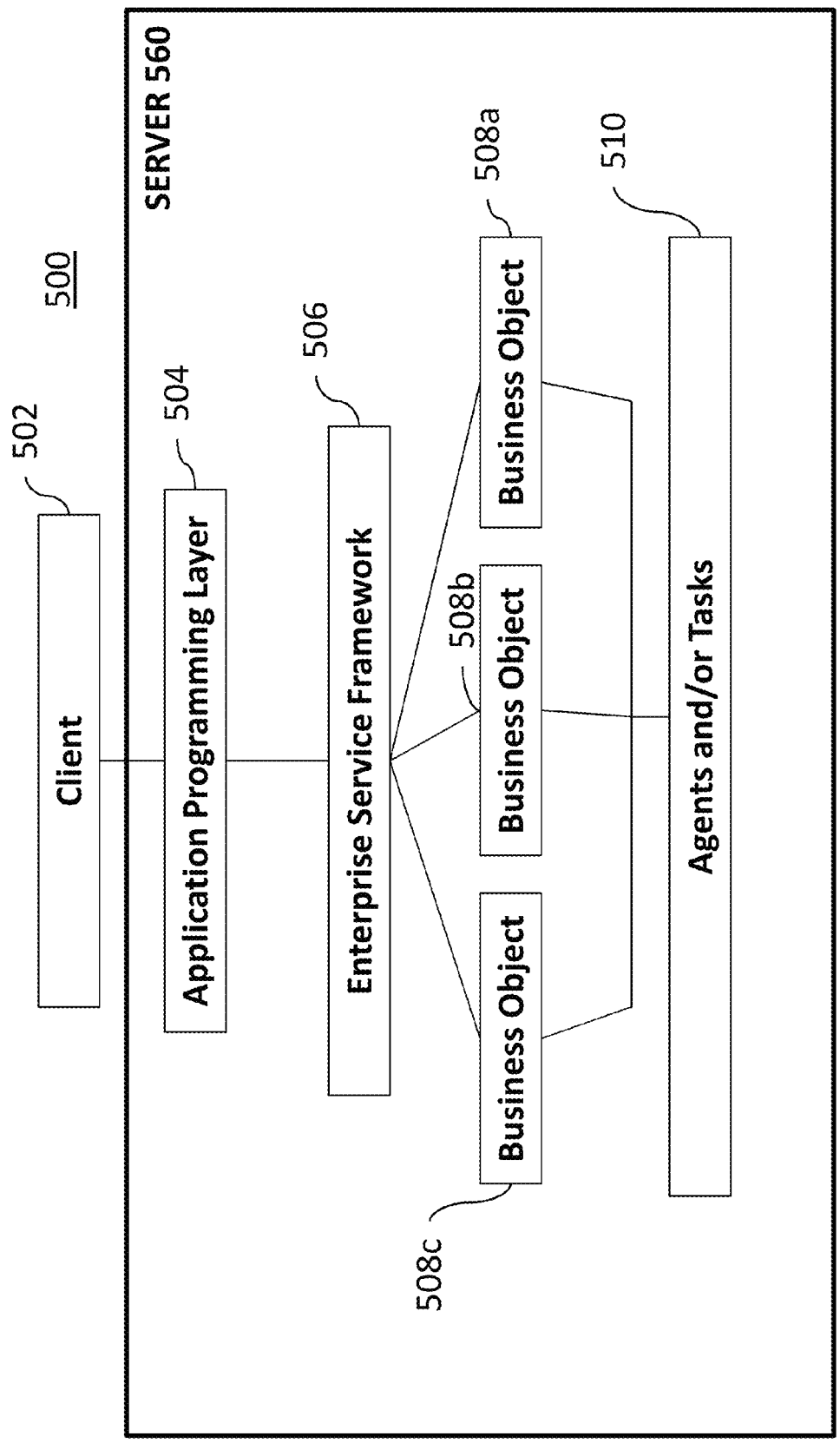
FIG. 5 illustrates an exemplary system for processing of business objects, according to some implementations of the current subject matter.

FIG. 5 illustrates an exemplary system 500 for processing of data structures, such as business objects. The system 500 can process and store business object data (e.g., the data fields of a business object). Examples of processing can include: determining consistency of data of the data object, such as a business object including data; performing saving procedures to store the data within a database and/or a repository; performing updates to the data that can be in a business object (e.g., updates due to newly created, entered, and/or saved data); and performing any other tasks that can manipulate, maintain and/or store data in the data objects.

In some implementations, the business object data can be stored in a repository that can be coupled to the system 500. The system 500 can be used to process various business objects (e.g., data structured according to a task, such as sales orders, a purchase orders, etc.).

A client application 502 can be used to enter, modify, update, etc. various data that can be processed and eventually passed onto a business object 508 for storage, retrieval, etc. The client application 502 can interact with an application processing layer 504 (such as those encoded in the Advanced Business Application Programming (ABAP) language) for the purposes of processing the data, such as, creation of sales orders, writing and editing reports and module pools, processing database table definitions, designing user interfaces, designing screens and flow logic, building function modules, etc.

The server 560 can be implemented as at least one processor and at least one memory and can include the application processing layer 504, an enterprise services layer 506, business objects 508, and agents 510.

The application processing layer 504 can interact with a framework (e.g., an enterprise service framework ("ESF") 506), which in turn, can be configured to interact with at least one business object 508. An example of the ESF is commercially available from SAP AG, Walldorf, Germany. The term "framework" can refer to a system of interrelated components, such as programs and the like, providing a business system for performing business functions. The ESF 506 can abstract the business objects, which can be modeled as services (also referred to as enterprise services) providing, for example, purchase order generation, sales order generation, and the like. Aggregating services into business-level enterprise services can provide more meaningful building blocks for the task of automating enterprise-scale business scenarios.

The ESF 506 can include a persistent repository for storing relevant pre-existing enterprise services, which can be made available to selected users. By using a repository, these selected users can use the pre-existing enterprise services to aid in the implementation of new services and corresponding business objects. As noted, the business object can represent an object, such as a data structure including data and operations, of significance to a business. Examples of business objects can include a purchase order, a sales order, a flight reservation, a shipping order, customer information, employee information, and the like. A service can thus provide an interface to enable other services and applications to access and process (e.g., create, fill-in, save, query, delete, print, send, and the like) the business object.

For exemplary illustrative purposes and for ease of description only, the following description will refer to a sales order and sales order data as an exemplary business object and business object data, respectively, although the current subject matter can be used with other types of data as well.

Business objects 508 and data related to business objects can be stored in a storage mechanism, such as a database or any other persistent storage repository. The system 500 can include an agent 510, which can be initiated upon receipt of data related to the business objects 508. For example, agent 510 can be used to perform various tasks, such as update information related to business objects stored in the database, further process the data, determine the order of storing the data, perform various database update tasks, etc. In some implementations, agents can serve as a bridge or a proxy for tasks, which can be executed after an initial task has been completed. In this case, agents can collect data and transform it in such a way so that the tasks can be processed later on by other components in the system 500. Agents can be configured to generate a message as output, where the message is provided to components in the system 500. Examples of agents may include at least one of the following: an output management agent, a task agent, an application agent, a business information agent, a business-to-business messages agent, and others. The output management agent can collect data for generating a form, which can be sent to a printer or via an email to a recipient. The task agent can collect information that may be needed to process a task and send the information to a recipient (e.g., for approval). The application can collect data that can be needed for a process in another application area. The business information agent can collect data for notification of a business information warehouse. The business-to-business messages agent can collect data that can be used to send information to an external business partner (e.g., information can be sent from a buyer to a supplier). To ensure global data consistency, the agents can collect data during a current session of the system 500.

The enterprise service framework 506 can generate a message indicating that the data that the client 502 entered has been successfully saved in the system 500. The message indicating successful storage can be presented to the client 502 via a user interface in the form of a message, such as a Hypertext Markup Language ("HTML") message. In some implementations, if a sales order object is being created and saved by the client 502, the HTML message indicating successful storage of the data can also include a sales order number, which can confirm that a particular sales order has been created and saved to the system 500. In some implementations, the message can be presented by automatically updating of the client's user interface, or by sending an email, an instant message, a text message, a multimedia message, etc. to the client 502, or in any other form. In order to save the business object data to the system 500, the system 500 can be configured to perform a save-and-exit procedure.

Figure 6:
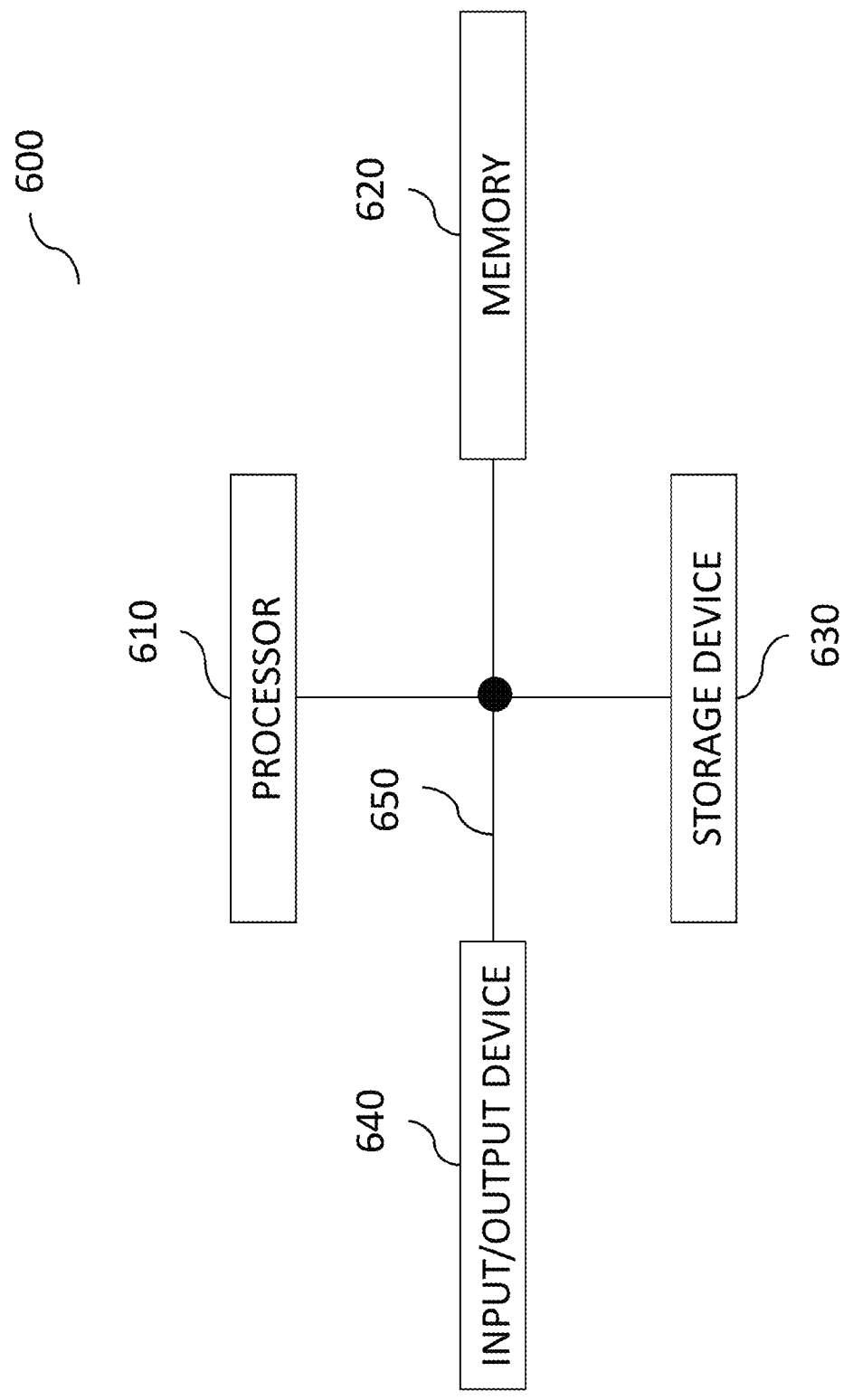
FIG. 6 illustrates an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
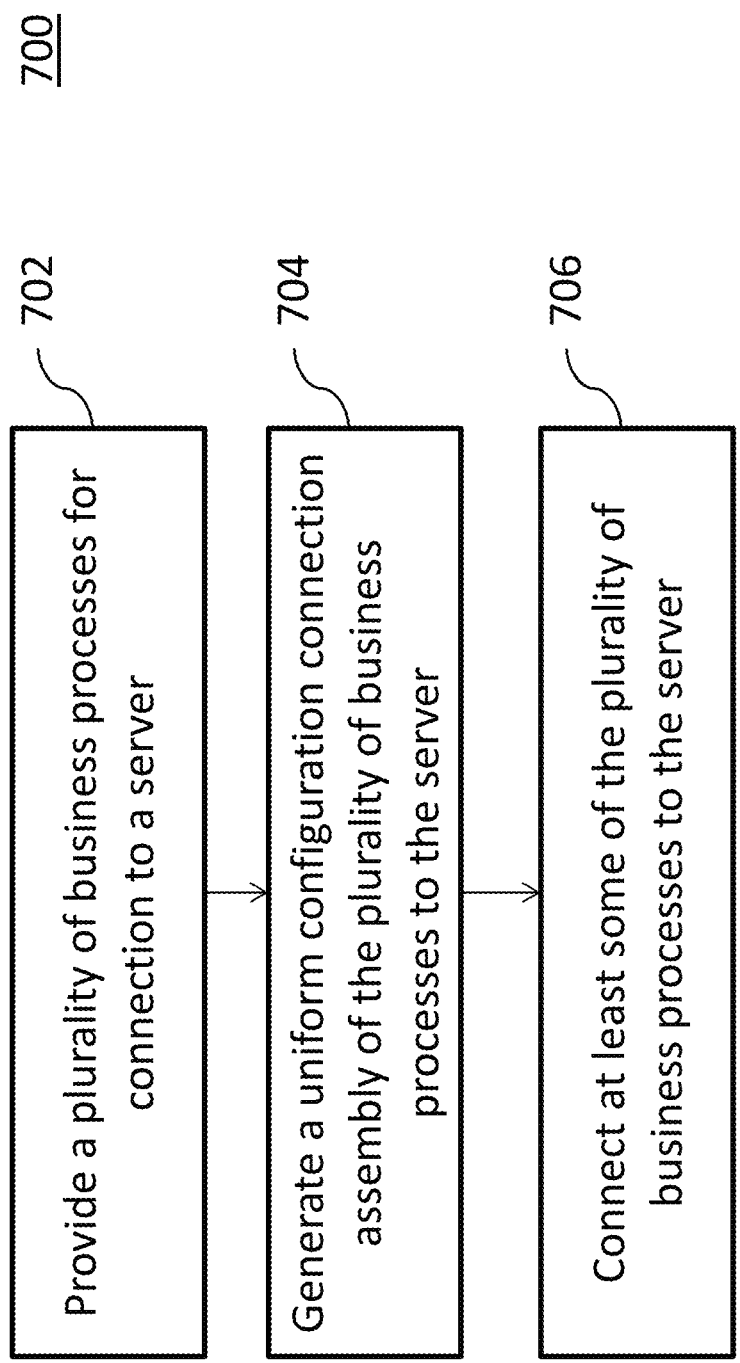
FIG. 7 illustrates an exemplary method, according to some implementations of the current subject matter.

FIG. 7 illustrates an exemplary method 700, according to some implementations of the current subject matter. At 702, a plurality of business processes for connection to a server can be provided. At 704, a uniform configuration connection assembly of the plurality of business processes to the server can be generated. The uniform configuration connection assembly can be configured based on at least one profile corresponding to at least one business process in the plurality of business processes and can contain at least one connectivity artifact for performing at least one connectivity task for at least one business process in the plurality of business processes. At 706, at least a portion of the plurality of business processes can be connected to the server based on the generated uniform configuration connection assembly. At least one of the providing, the generating, and the connecting can be performed on at least one processor.

In some implementations, the current subject matter can include one or more of the following optional features. The plurality of business processes can include at least one of the following: a service, a destination, and a service proxy. The service proxy can be a local representation of a remote process. At least one business process in the plurality of business processes can be an external business process. The generated uniform configuration connection assembly can be generated based on a grouping of a plurality of profiles of at least a portion of business processes in the plurality of business profiles. At least one connectivity artifact may include at least one of the following: a connectivity client for initiating at least one communication request, processing data, sending data or receiving data associated with at least one business process in the plurality of business processes, a connectivity server for accepting the at least one communication request, processing data, sending data, or receiving data associated with the at least one business process, a client configuration data, a server configuration data, and data grouped together for reuse in any of the above-mentioned artifacts. The server can be an advanced business application programming server.

In some implementations, at least one profile can include at least one combination of attributes corresponding to at least one configuration of the uniform configuration assembly. The attributes can include at least one of the following: an attribute indicating encryption, an attribute indicating compression, an attribute indicating whether a callback is allowed, an attribute indicating whether a pop-up is allowed, a sequence of logon algorithms, a uniform resource locator for the at least one business process, an attribute indicative of an action in an error case, a virtual host information for the at least one business process, and a combination of any of the above attributes.

In some implementations, the uniform configuration connection assembly can be configured without configuring each business process in the plurality of business processes. At least one profile for at least one business process in the plurality of business processes can be combined within at least another profile for at least another business process in the plurality of business processes based on at least one of the following: an inheritance information for at least one of the at least one profile and at least another profile, and a listing of independent profiles.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method comprising:
   receiving, at a server having at least one processor, a plurality of business processes for connection to the server, each business process having an independent connectivity profile, wherein each connectivity profile includes at least one profile object having at least one connectivity artifact and at least one connectivity attribute;
   generating, by the server, a uniform configuration connection assembly for connecting the plurality of business processes to the server;
   configuring, by the server, the uniform configuration connection assembly based on at least one profile corresponding to at least one business process in the plurality of business processes and a listing of independent profiles from the plurality of business processes, the configuring comprising grouping profile objects from the plurality of business processes based on the at least one connectivity artifact associated with each object, wherein the grouping is further based on a determination that at least one profile object includes at least one attribute having a value selectable based on a determination that the at least one attribute exists in at least another profile, and wherein the uniform configuration connection assembly contains at least one connectivity artifact and connectivity attribute for each group of profile objects for performing the at least one connectivity task for at least one business process in the plurality of business processes;
   receiving, by the server, a request to connect at least one additional business process having an independent connectivity profile to the server using the uniform configuration connection assembly;
   executing, by the server, a web service framework that determines whether to overwrite at least one attribute associated with the uniform configuration connection assembly based on a determination that the at least one attribute exists in the both the uniform configuration connection assembly and the connectivity profile of the at least one additional business process;
   determining, by the server using the web service framework, to overwrite the at least one attribute associated with the uniform configuration connection assembly using a value associated with the attribute from the connectivity profile of the at least one additional business process based on at least one of the following: an importance of the at least one attribute, a security setting associated with the at least one attribute, a user setting, and any combination thereof; and
   overwriting, based on the determining, the at least one attribute associated with the uniform configuration connection assembly; and
   connecting, based on the generated uniform configuration connection assembly, at least a portion of the plurality of business processes to the server.

2. The method according to claim 1, wherein the plurality of business processes includes at least one of the following:

a service, a destination, and a service proxy being a local representation of a remote service.

3. The method according to claim 1, wherein at least one business process in the plurality of business processes is an external business process.

4. The method according to claim 1, wherein the generated uniform configuration connection assembly is generated based on a grouping of a plurality of profiles of at least a portion of business processes in the plurality of business profiles.

5. The method according to claim 1, wherein the at least one connectivity artifact includes at least one of the following:
   a connectivity client for initiating at least one communication request, processing data, sending data or receiving data associated with at least one business process in the plurality of business processes,
   a connectivity server for accepting the at least one communication request, processing data, sending data, or receiving data associated with the at least one business process,
   a client configuration data,
   a server configuration data, and
   data grouped together for reuse in any of the above-mentioned artifacts.

6. The method according to claim 1, wherein the server is an advanced business application programming server.

7. The method according to claim 1, wherein the at least one profile includes at least one combination of attributes corresponding to at least one configuration of the uniform configuration assembly.

8. The method according to claim 7, wherein the attributes include at least one of the following: an attribute indicating encryption, an attribute indicating compression, an attribute indicating whether a callback is allowed, an attribute indicating whether a pop-up is allowed, a sequence of logon algorithms, a uniform resource locator for the at least one business process, an attribute indicative of an action in an error case, a virtual host information for the at least one business process, and a combination of any of the above attributes.

9. The method according to claim 1, wherein the uniform configuration connection assembly is configured without configuring each business process in the plurality of business processes.

10. The method according to claim 1, wherein the at least one profile for at least one business process in the plurality of business processes is combined within at least another profile for at least another business process in the plurality of business processes based on at least one of the following: an inheritance information for at least one of the at least one profile and at least another profile, and a listing of independent profiles.

11. A computer-program product comprising a non-transitory machine-readable medium storing instructions that, when executed by at least one programmable processor, cause the at least one programmable processor to perform operations comprising:
   receiving, at a server having at least one processor, a plurality of business processes for connection to the server, each business process having an independent connectivity profile, wherein each connectivity profile includes at least one profile object having at least one connectivity artifact and at least one connectivity attribute;
   generating, by the server, a uniform configuration connection assembly for connecting the plurality of business processes to the server;
   configuring, by the server, the uniform configuration connection assembly based on at least one profile corresponding to at least one business process in the plurality of business processes and a listing of independent profiles from the plurality of business processes, the configuring comprising grouping profile objects from the plurality of business processes based on the at least one connectivity artifact associated with each object, wherein the grouping is further based on a determination that at least one profile object includes at least one attribute having a value selectable based on a determination that the at least one attribute exists in at least another profile, and wherein the uniform configuration connection assembly contains at least one connectivity artifact and connectivity attribute for each group of profile objects for performing the at least one connectivity task for at least one business process in the plurality of business processes;
   receiving, by the server, a request to connect at least one additional business process having an independent connectivity profile to the server using the uniform configuration connection assembly;
   executing, by the server, a web service framework that determines whether to overwrite at least one attribute associated with the uniform configuration connection assembly based on a determination that the at least one attribute exists in the both the uniform configuration connection assembly and the connectivity profile of the at least one additional business process;
   determining, by the server using the web service framework, to overwrite the at least one attribute associated with the uniform configuration connection assembly using a value associated with the attribute from the connectivity profile of the at least one additional business process based on at least one of the following: an importance of the at least one attribute, a security setting associated with the at least one attribute, a user setting, and any combination thereof; and
   overwriting, based on the determining, the at least one attribute associated with the uniform configuration connection assembly; and
   connecting, based on the generated uniform configuration connection assembly, at least a portion of the plurality of business processes to the server.

12. The computer-program product according to claim 11, wherein the plurality of business processes includes at least one of the following: a service, a destination, and a service proxy being a local representation of a remote service;
   wherein at least one business process in the plurality of business processes is an external business process.

13. The computer-program product according to claim 11, wherein the generated uniform configuration connection assembly is generated based on a grouping of a plurality of profiles of at least a portion of business processes in the plurality of business profiles.

14. The computer-program product according to claim 11, wherein the at least one connectivity artifact includes at least one of the following:
   a connectivity client for initiating at least one communication request, processing data, sending data or receiving data associated with at least one business process in the plurality of business processes, a connectivity server for accepting the at least one communication request, processing data, sending data, or receiving data associated with the at least one business process, a client configuration data, a server configuration data, and data grouped together for reuse in any of the above-mentioned artifacts.

15. The computer-program product according to claim 11, wherein the at least one profile includes at least one combination of attributes corresponding to at least one configuration of the uniform configuration assembly;

wherein the attributes include at least one of the following: an attribute indicating encryption, an attribute indicating compression, an attribute indicating whether a callback is allowed, an attribute indicating whether a pop-up is allowed, a sequence of logon algorithms, a uniform resource locator for the at least one business process, an attribute indicative of an action in an error case, a virtual host information for the at least one business process, and a combination of any of the above attributes.

16. A system comprising:

at least one programmable processor; and a machine-readable medium storing instructions that, when executed by the at least one programmable processor, cause the at least one programmable processor to perform operations comprising:

receiving, at a server having at least one processor, a plurality of business processes for connection to the server, each business process having an independent connectivity profile, wherein each connectivity profile includes at least one profile object having at least one connectivity artifact and at least one connectivity attribute;

generating, by the server, a uniform configuration connection assembly for connecting the plurality of business processes to the server;

configuring, by the server, the uniform configuration connection assembly based on at least one profile corresponding to at least one business process in the plurality of business processes and a listing of independent profiles from the plurality of business processes, the configuring comprising grouping profile objects from the plurality of business processes based on the at least one connectivity artifact associated with each object, wherein the grouping is further based on a determination that at least one profile object includes at least one attribute having a value selectable based on a determination that the at least one attribute exists in at least another profile, and wherein the uniform configuration connection assembly contains at least one connectivity artifact and connectivity attribute for each group of profile objects for performing the at least one connectivity task for at least one business process in the plurality of business processes;

receiving, by the server, a request to connect at least one additional business process having an independent connectivity profile to the server using the uniform configuration connection assembly;

executing, by the server, a web service framework that determines whether to overwrite at least one attribute associated with the uniform configuration connection assembly based on a determination that the at least one attribute exists in the both the uniform configuration connection assembly and the connectivity profile of the at least one additional business process;

determining, by the server using the web service framework, to overwrite the at least one attribute associated with the uniform configuration connection assembly using a value associated with the attribute from the connectivity profile of the at least one additional business process based on at least one of the following: an importance of the at least one attribute, a security setting associated with the at least one attribute, a user setting, and any combination thereof; and overwriting, based on the determining, the at least one attribute associated with the uniform configuration connection assembly; and connecting, based on the generated uniform configuration connection assembly, at least a portion of the plurality of business processes to the server.

17. The system according to claim 16, wherein the generated uniform configuration connection assembly is generated based on a grouping of a plurality of profiles of at least a portion of business processes in the plurality of business profiles.

18. The system according to claim 16, wherein the at least one connectivity artifact includes at least one of the following:

a connectivity client for initiating at least one communication request, processing data, sending data or receiving data associated with at least one business process in the plurality of business processes, a connectivity server for accepting the at least one communication request, processing data, sending data, or receiving data associated with the at least one business process, a client configuration data, a server configuration data, and data grouped together for reuse in any of the above-mentioned artifacts.

19. The system according to claim 16, wherein the at least one profile includes at least one combination of attributes corresponding to at least one configuration of the uniform configuration assembly;

wherein the attributes include at least one of the following: an attribute indicating encryption, an attribute indicating compression, an attribute indicating whether a callback is allowed, an attribute indicating whether a pop-up is allowed, a sequence of logon algorithms, a uniform resource locator for the at least one business process, an attribute indicative of an action in an error case, a virtual host information for the at least one business process, and a combination of any of the above attributes.

* * * * *